(12) United States Patent
Stieglitz et al.

(10) Patent No.: US 7,546,632 B2
(45) Date of Patent: Jun. 9, 2009

(54) METHODS AND APPARATUS TO CONFIGURE A NETWORK DEVICE VIA AN AUTHENTICATION PROTOCOL

(75) Inventors: Jeremy E. Stieglitz, Menlo Park, CA (US); Darran Potter, West Malling (GB); Mark C. Wilgus, Champaign, IL (US)

(73) Assignee: Cisco Technology, Inc., San Jose, CA (US)

( * ) Notice: Subject to any disclaimer, the term of this patent is extended or adjusted under 35 U.S.C. 154(b) by 885 days.

(21) Appl. No.: 11/059,835

(22) Filed: Feb. 17, 2005

(65) Prior Publication Data

US 2006/0185001 A1     Aug. 17, 2006

(51) Int. Cl.
  *H04L 9/32*  (2006.01)
  *H04L 9/00*  (2006.01)
  *G06K 9/00*  (2006.01)
  *G06F 17/30* (2006.01)

(52) U.S. Cl. .................. 726/3; 726/4; 726/12; 713/168
(58) Field of Classification Search ....... 726/3
  See application file for complete search history.

(56) References Cited

U.S. PATENT DOCUMENTS 7,299,354 B2 * 11/2007 Khanna et al. ............... 713/165
2004/0093522 A1 * 5/2004 Bruestle et al. ............. 713/201

OTHER PUBLICATIONS

Cisco Systems, 'Cisco Unified IP Phone 7906G and 7911G Administration Guide for Cisco Unified Communications Manager 6.1', Cisco Systems, Inc., 2007, Text Part No. OL-14585-01, chapters 1-3, http://www.cisco.com/en/US/docs/voice_ip_comm/cuipph/7906g_7911g/5_1/sip/english/administration/guide/1106ovr.pdf.*

* cited by examiner

*Primary Examiner*—Kambiz Zand
*Assistant Examiner*—Ronald Baum

(57) ABSTRACT

A system supplies configuration information, via an EAP protocol, to a remote device trying to access the network. An authentication server performs an authentication exchange by receiving, from a remote device, a connection attempt to access the network. The authentication server performs an authentication exchange with the remote device to allow the remote device access to the network. During the authentication exchange, a configuration selection characteristic associated with the remote device is identified. A device configuration to be applied to the remote device, based on the configuration selection characteristic, is determined. The authentication server provides the determined device configuration to the remote device, via an EAP protocol, to allow the remote device to install the determined device configuration prior to being allowed access to the network.

12 Claims, 7 Drawing Sheets

209 EXTEND THE PEAP OR TLV-FAST PROTOCOL TO INCLUDE A SUB-TYPE FIELD, THE SUB-TYPE FIELD SPECIFYING AT LEAST ONE OF:
I) A CONFIGURATION REQUEST TO THE REMOTE DEVICE; AND
II) A CONFIGURATION RESPONSE FROM THE REMOTE DEVICE

211 PROVIDE A REQUEST FOR AN EXISTING CONFIGURATION STATUS OF THE REMOTE DEVICE IN THE EXTENSIBLE AUTHENTICATION PROTOCOL CONFIGURATION

OR

212 PROVIDE A SETTING OF A PARTICULAR CONFIGURATION STATUS ON THE REMOTE DEVICE IN THE EXTENSIBLE AUTHENTICATION PROTOCOL CONFIGURATION

OR

213 PROVIDE A TRIGGER OF AN EVENT THAT REQUEST AN ACTION TO BE PERFORMED ON THE REMOTE DEVICE IN THE EXTENSIBLE AUTHENTICATION PROTOCOL CONFIGURATION

OR

214 RECEIVE VALUES FOR A REQUESTED CONFIGURATION STATUS FROM THE REMOTE DEVICE

OR

215 CONFIRM AN EVENT WAS EXECUTED

FIG. 5

204 DETERMINE A DEVICE CONFIGURATION TO BE APPLIED TO THE REMOTE DEVICE BASED ON THE CONFIGURATION SELECTION CHARACTERISTIC

216 SPECIFY AN ACCEPTABLE ACCESS LEVEL FOR THE REMOTE DEVICE, THE ACCEPTABLE ACCESS LEVEL INDICATING A SECURITY LEVEL FOR THE REMOTE DEVICE WITHIN THE NETWORK, THE ACCEPTABLE ACCESS LEVEL BASED ON THE IDENTIFIED CONFIGURATION SELECTION CHARACTERISTIC THAT IS AT LEAST ONE OF:
I) A LOCATION OF THE REMOTE DEVICE WITHIN THE NETWORK;
II) A TYPE OF THE REMOTE DEVICE WITHIN THE NETWORK;
III) A REQUESTED LEVEL OF ACCESS ON THE NETWORK THE REMOTE DEVICE IS REQUESTING; AND
IV) A ROLE OF THE REMOTE DEVICE WITHIN THE NETWORK

OR

217 SELECT A PLURALITY OF DEVICE CONFIGURATIONS, ONE OF WHICH, WHEN INSTALLED ON THE REMOTE DEVICE, WOULD ALLOW THE REMOTE DEVICE TO SUCCESSFULLY COMPLETE THE AUTHENTICATION EXCHANGE PROCESS, AND SECURELY ACCESS THE NETWORK

218 TRANSMIT A PLURALITY OF DETERMINED DEVICE CONFIGURATIONS TO THE REMOTE DEVICE

219 ALLOW THE REMOTE DEVICE CHOOSE A MOST ACCEPTABLE DETERMINED DEVICE CONFIGURATION

*FIG. 6*

220 RECEIVE A RESPONSE FROM THE REMOTE DEVICE INDICATING AN INSTALLATION STATE OF THE DETERMINED DEVICE CONFIGURATION

221 VERIFY THE REMOTE DEVICE HAS INSTALLED THE DETERMINED DEVICE CONFIGURATION, AND IF NOT, PROVIDING THE DETERMINED DEVICE CONFIGURATION TO THE REMOTE DEVICE DURING THE AUTHENTICATION PROCESS TO ALLOW THE REMOTE DEVICE TO INSTALL THE DETERMINED DEVICE CONFIGURATION PRIOR TO BEING ALLOWED ACCESS TO THE NETWORK

222 SPECIFY A RESULT OF THE AUTHENTICATION EXCHANGE, BASED ON THE RESPONSE

223 CREATE A CHECKSUM VALUE RELATED TO THE REMOTE DEVICE

224 DETECT A SUCCESSIVE CONNECTION ATTEMPT FROM THE REMOTE DEVICE, AND IN RESPONSE, PERFORMING AN ABBREVIATED AUTHENTICATION EXCHANGE THAT PERFORMS A COMPARISON PROCESS, UPON RECEIPT OF THE SUCCESSIVE CONNECTION ATTEMPT FROM THE REMOTE DEVICE, USING THE CHECKSUM VALUE, THE COMPARISON PROCESS COMPRISING COMPARING THE CHECKSUM VALUE TO AN IDENTITY ASSOCIATED WITH THE REMOTE DEVICE, TO DETERMINE WHETHER THE REMOTE DEVICE HAS PREVIOUSLY COMPLETED THE AUTHENTICATION EXCHANGE PROCESS SUCCESSFULLY

225 STORE THE RESULT OF THE AUTHENTICATION EXCHANGE

*FIG. 7*

METHODS AND APPARATUS TO CONFIGURE A NETWORK DEVICE VIA AN AUTHENTICATION PROTOCOL

BACKGROUND

Conventional computerized devices, such as personal computers, laptop computers, and data communications devices (e.g., routers, switches, gateways and the like) exchange data over networks using a variety of communications mechanisms. In order to ensure privacy during these exchanges, and to prevent any malicious attacks, it is necessary to have a secured connection. There are many methods available for ensuring a secured connection. Often, the secured connection is created using an authentication process that occurs during operation of a Point to Point Protocol (PPP) to authenticate the devices involved in a data communications session. The authentication process can be performed by Remote Authentication Dial-In User Service (RADIUS) servers, using a Challenge Handshake Authentication Protocol (CHAP) or Password Authentication Protocol (PAP). The Extensible Authentication Protocol (EAP) can provide additional authentication methods to be used during the authentication process within PPP.

EAP carries authentication information from a device attempting to connect to the network, to an authentication system that validates and authorizes the connection. EAP creates a secure tunnel through a gateway with which to perform this mutual authentication process, protecting weaker methods of authentication. During an EAP exchange, there thus exists an authentication server and the device being authenticated. The authentication server sends a request to the device for authentication information. The device sends a response to the authentication server in reply to each request from the authentication server. The authentication server ends the authentication exchange with a Success or Failure packet indicating if the device has been authenticated for access to the network.

SUMMARY

Conventional technologies for allowing remote access on a network suffer from a variety of deficiencies. In particular, conventional technologies that provide network access between conventional devices are limited to establishing a network connection and performing authentication, but do not ensure proper network configuration of the device authenticated to communicate on the network. For example, a wireless remote device might be required to contain a specific network configuration in order to communicate with devices in a specific wireless network. Or, a wireless remote device might require a network configuration which only seeks out a particular certified network. Remote devices on a network, or that attempt to access a network, may be configured improperly which could cause communication problems or jeopardize security on the network. This improper configuration could include lack of current firmware, and/or lack of proper security settings or other configuration problems.

One solution to this problem might be to provide proper configuration information to a remote device after authenticating the device and allowing that remote device to access the network. However, this solution jeopardizes the security of the network by allowing a potentially improperly configured remote device onto the network prior to verifying and/or establishing the configuration of the remote device.

Embodiments of the invention significantly overcome such deficiencies and provide a system that includes an authentication server executing an authentication exchange with a remote device which is attempting to access the network, and during the authentication process, the system provides device configuration to the remote device. Once the remote device responds with the information that the remote device has installed the supplied device configuration, the authentication system allows the remote device to safely access the network.

During an example operation of one embodiment, suppose a company gives laptops to its employees for company use when the employees are traveling on business. In order to prevent malicious attacks, the company wants to ensure that the employees only access Cisco certified networks, when using these laptops. When a laptop, acting as a remote device, tries to access the network, the authentication server receives a connection attempt to access the network. The authentication server performs an authentication exchange with the company laptop in accordance with configurations explained herein. During the authentication exchange, the authentication server identifies characteristics about the company laptop, which aids the authentication server in selecting the appropriate network configuration for that company laptop. In other words, in one configuration, there may be multiple available configurations and the system explained herein can select one of such configurations for application to the remote device based on some characteristics. These characteristics can be, for example, the location of the company laptop within the network (e.g., a sub-network or port upon which the connection attempt is made), the access level within the network the company laptop is requesting, the role and/or type of the company laptop, or other characteristics. Based on one or more of these characteristics, the authentication server determines a proper device configuration to be applied to the company laptop. The authentication server then provides the proper device configuration to the company laptop during the operation of the authentication protocol, which in one configuration is an EAP-based protocol. Specifically, one example configuration provides an extension to an EAP-based protocol to allow configuration information to be applied or "programmed" into the remote device to be piggybacked onto an EAP message that is transmitted from the authentication server to the remote device. The company laptop receives this authentication protocol exchange message containing the configuration data and installs the specified proper device configuration to allow proper access to the network, which in this example case is a Cisco certified network.

As noted above, in one embodiment, the authentication exchange is an extensible authentication protocol (EAP)-based exchange, to allow the authentication server to authenticate the identity of the company laptop to the authentication server. In this embodiment, the authentication server creates an EAP message, populates it with the proper device configuration, and transmits it to the company laptop. Through the use of EAP, support for a number of enhanced authentication schemes may be added, including smart cards, Kerberos, Public Key encryption or distribution, One Time Passwords, etc.

In one embodiment, the EAP-based exchange is an extension to a Protected Extensible Authentication Protocol (PEAP) or Type-Length-Value Flexible Authentication via Secure Tunneling (TLV-FAST) protocol. The PEAP or TLV-FAST protocol message as explained herein contains the proper device configuration, when transmitted to the company laptop. In return, the authentication server receives a response from the company laptop within a PEAP or TLV-FAST protocol.

In one embodiment, the PEAP or TLV-FAST protocol is extended to include a sub-type field. In this example, that sub-type field would specify either a configuration request to the company laptop (e.g., specifying configuration information that the remote device is to apply if access is to be granted), or a configuration response from the company laptop (e.g., that the current configuration is some value, or a confirmation that the provided configuration information has been installed in the remote device).

In one embodiment, the configuration request within the sub-type field of PEAP or TLV-FAST protocol from the authentication server to the company laptop would specify a request for an existing configuration status of the company laptop. In another embodiment, the configuration request would provide a setting (e.g., a configuration parameter value, such as an SSID for to use for a wireless network access) for the company laptop. In yet another embodiment, the configuration request would trigger an event to be executed on the company laptop (e.g., run a virus scan).

In one embodiment, the configuration response within the sub-type field of PEAP or TLV-FAST protocol from the company laptop to the authentication server would contain values which were requested from the authentication server. In another embodiment, the configuration response would contain confirmation that a requested event was executed on the company laptop.

In one embodiment, the authentication server determines the proper device configuration to be applied to the company laptop by specifying an acceptable access level for the company laptop. That acceptable access level is determined by the location of the company laptop within the network, the type of company laptop, the role of the company laptop or the level of network access that the company laptop is requesting.

In one embodiment, when the authentication server determines the proper device configuration for the company laptop, the authentication server selects several device configurations which would be appropriate for the company laptop, and transmits those device configurations to the company laptop. The company laptop can, in turn, choose which device configuration is most acceptable.

In one embodiment, the authentication server receives a response from the company laptop, and based on that response, specifies a result of the authentication exchange process. The authentication server then stores the result of the authentication exchange with the company laptop.

In one embodiment, when the authentication server receives a response from the company laptop, the authentication server verifies the company laptop has installed the device configuration. If the company laptop has not installed the device configuration, the authentication server provides the device configuration to the company laptop, continually, in response to the network access request from the company laptop, until the company laptop installs the device configuration.

In one embodiment, a checksum related to the company laptop is created to specify a result of the authentication exchange. When the authentication server detects a connection attempt by the company laptop, the authentication server performs a quick compare with the checksum value associated with that company laptop, to determine if the company laptop has previously successfully completed an authentication exchange, and if so, the authentication server allows the company laptop to connect to the network.

Other embodiments of the invention include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention.

It is to be understood that the system of the invention may be embodied strictly as a software program, as software and hardware, or as hardware alone. The features of the invention, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 5 illustrates a flowchart of a procedure performed by the system of FIG. 4, when the EAP protocol is extended to include a sub-type field, specifying a request to the remote device or a response from the remote device, according to one embodiment of the invention.

FIG. 6 illustrates flowcharts of a procedure performed by the system of FIG. 3, when the authentication server determines a device configuration to be applied to the remote device based on the configuration selection characteristic, according to one embodiment of the invention FIG. 7 illustrates a flowchart of a procedure performed by the system of FIG. 1, when the authentication server receives a response from the remote device indicating an installation state of the determined device configuration, according to one embodiment of the invention.

DETAILED DESCRIPTION

Figure 1:
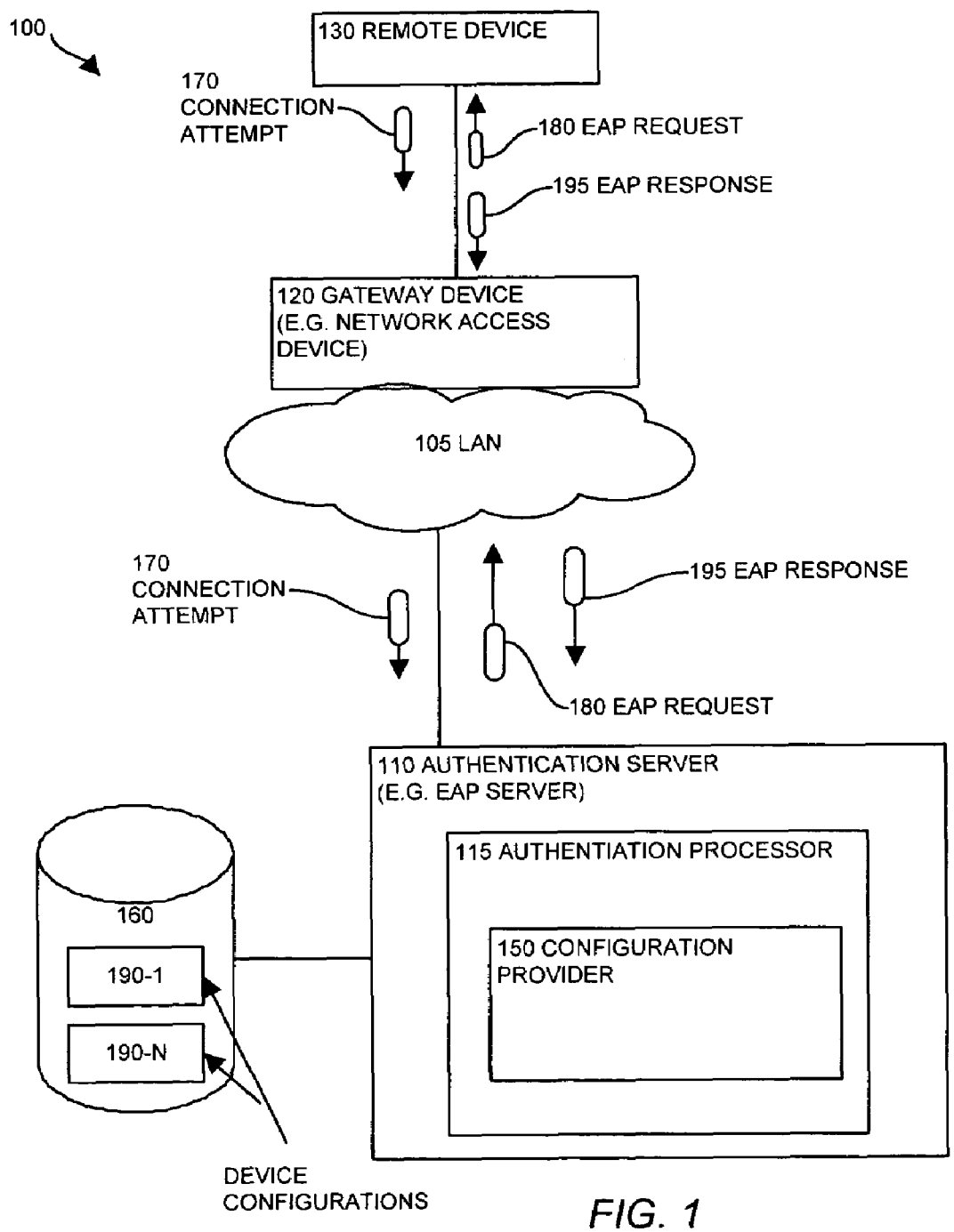
FIG. 1 shows a high level view of a network according to one embodiment of the invention.

Embodiments of the invention include an authentication server that performs an authentication exchange with a remote device via an extensible authentication protocol, and during this exchange, transmits network configuration information to the remote device by bundling the network configuration information into the extensible authentication protocol prior to allowing the remote device to access the network. This allows a device configuration to be modified with preferred settings before access to the network is granted. Since authentication protocols such as EAP are often performed early on in the startup of certain devices (e.g., early in the boot up sequence of devices, or as a first step when a device such as a user device attempts to detect the presence of network availability). Accordingly, by providing configuration information during the authentication protocol to the remote device, the configuration of the remote device can be assured to be most compatible with preferred network settings. Alternatively, the configuration information that can be remotely provided from the authentication server during the authentication protocol can be required of the device (and may require an acknowledgement that the configuration was instantiated within the remote device) in order for the authentication sequence to complete to allow access to the network.

The system disclosed herein includes a subject device (e.g., remote device) attempting to access the network. An authentication server detects a connection attempt from the subject device, and performs an extensible authentication exchange with the subject device to authenticate the identity of the device to the authentication server. In one configuration, the authentication server identifies a characteristic about the subject device which aids the authentication server in determining which network configuration information needs to be transmitted to the subject device prior to allowing the device to access the network. Once the configuration selection characteristic of the subject device has been identified, it is used to determine which device configuration should be transmitted to the subject device. Alternatively, the configuration of devices may be more static in nature such that a preset configuration is selected no matter what device is attempting to communicate onto the network. Within the extensible authentication exchange between the authentication server and the subject device, configurations explained herein transmit the device configuration to the subject device to allow the subject device to install the device configuration. Once the device configuration has been installed on the subject device to the satisfaction of the authentication server, the subject device is given access to the network. In another alternative, the level of access granted can be contingent on what assurance is provided back from the remote device that the configuration information is properly installed on that remote device. Thus the authentication server might grant different levels of network access depending on the response received during the authentication protocol concerning application of the configuration into the remote device.

The mechanisms described herein allow for the network configuration of a device to be verified prior to being allowed access to the network. During the connection process, the extensible authentication exchange is one of the first processes which is executed. By insuring the network configuration of the device (attempting to access the network) is acceptable prior to allowing access, the techniques and mechanisms presented herein prevent security problems. Within this process, the techniques and mechanisms presented herein might, for example, allow no devices onto the network until they are properly configured for the network.

During the authentication exchange, the authentication server creates an extensible authentication exchange message to transmit (i.e. to carry or transport) the device configuration to the remote device. The extensible authentication exchange message, similar to a PEAP or TLV-FAST protocol, is populated with the device configuration by extending the extensible authentication exchange message to include a sub-type field. The sub-type field contains either a request to the device or a response from the device.

When the authentication server sends, to the device, an extensible authentication exchange protocol message extended with a sub-type field containing a request to the device, the authentication server can request an existing configuration status of the device. Alternatively, the authentication server can request the device to provide the setting of a particular configuration variable. In another alternative, the authentication server can also require the device to perform an action required by the authentication server.

When the authentication server receives, from the device, an extensible authentication exchange protocol extended with a sub-type field containing a response from the device, that response can contain the setting of a requested configuration variable. Alternatively, the response can contain confirmation that a requested action has been executed.

During the process of determining the appropriate device configuration to be applied or granted to the device, the authentication server bases that decision on the appropriate access level to grant to the device. That access level can be based on the location of the device within the network, the type of the device, the role of the device within the network, or the level of access requested by the device or other information such as time of day, date, and so forth.

The authentication server can determine that there are several appropriate device configurations for the device, which, when installed by the device, to the satisfaction of the authentication server, would still maintain the integrity of the network. In this scenario, the authentication server transmits multiple device configurations to the device, allowing the device to determine the most appropriate configuration to install.

After the authentication server sends the configuration (or configurations) to the device, the authentication server receives, in return, a response from the device, indicating the status of the configuration installation. This may include an identification of which configuration was installed. The authentication server determines if the configuration was properly installed on the device. If not, the authentication server resends the configuration to the device. This process is repeated until the configuration is installed on the device, to the satisfaction of the authentication server.

Based on the response from the device, the authentication server specifies a result, and stores the result of the authentication exchange in a database. This result can be used for a quick check of the device when the device attempts to make another connection to the network.

Once a device has successfully completed the authentication exchange, the authentication server creates a checksum value related to that successful authentication, and stores it in the database. When the device attempts to connect again to the network, for example, if the device has rebooted and is now attempting to re-connect to the network, the authentication server performs a quick comparison between the checksum stored in the database with the device's identifier, to determine whether the device has successfully completed the authentication exchange in the recent past (configurable amount of time). In this manner, if the device was recently authenticated, it can be assumed that the device is still configured properly and authentication need not include providing a configuration.

FIG. 1 illustrates an example computer environment 100 suitable for use in explaining example embodiments of this invention. The computer networking environment 100 includes a computer network 105, such as a local area network (LAN) which interconnects a gateway device 120, a remote device 130 and an authentication server 110. The authentication device 10 receives a connection attempt 170 via the gateway device 120. It should be noted that the gateway device 120 could be any sort of network access device. The authentication server 110 contains an authentication processor 115, which performs the authentication exchange. As part of the authentication exchange, the authentication processor 115 runs a configuration provider 150, which obtains the appropriate device configuration 190 from the database 160. When the authentication exchange process, which will be explained in further details below, is completed, the authentication server 110 transmits the appropriate device configuration 190 embedded within an EAP request 180, to the remote device 130. The remote device 130, in return, transmits an EAP response 195 to the authentication server 110. The authentication server 110 then communicates the result of this exchange with a database 160, as will be explained in detail shortly.

When a remote device 130 attempts to connect to the network 100, the authentication server 110 receives that connection attempt 170 via the gateway device 120. Using an extensible authentication exchange to create a secured tunnel within the gateway device 120, the authentication server 110 performs an authentication exchange via the authentication processor 115. During the authentication exchange, an appropriate device configuration 190 is selected by the configuration provider 150, and provided by the database 160 to the authentication processor 115. The authentication processor 115 creates an EAP request 180 with which to transmit the selected device configuration 190 to the remote device 130.

The EAP request 180 may be a Protected Extensible Authentication Protocol (PEAP) or Type-Length-Value Flexible Authentication via Secure Tunneling (TLV-FAST) protocol. The EAP request 180 consists of an extensible authentication exchange message extended to include a sub-type field containing a request from the authentication server 110 to the remote device 130. The EAP response 195 consists of an extensible authentication exchange message extended to include a sub-type field containing a response from the remote device 130 to the authentication server 110.

The authentication server 110 transmits the selected device configuration 190 to the remote device 130 via the EAP request 180. In return, the remote device 130 provides an EAP response 195. Embedded within the EAP response 195 is the response from the remote device 130, in response to the request from the authentication server 110, which is embedded within the EAP request 180.

When the authentication server 110 is satisfied that the remote device 130 has successfully installed the device configuration 190, the authentication server 110 stores the result in the database 160. If the authentication server 110 determines that the remote device 130 has not successfully installed the device configuration 190, the authentication server 110 continues to transmit the EAP request 180 until the authentication server 110 is satisfied that the device configuration 190 has been successfully installed on the remote device 130.

Further details of configurations explained herein will now be provided with respect to a flow chart of processing steps that show the high level operations of the invention to perform the authentication exchange.

Figure 2:
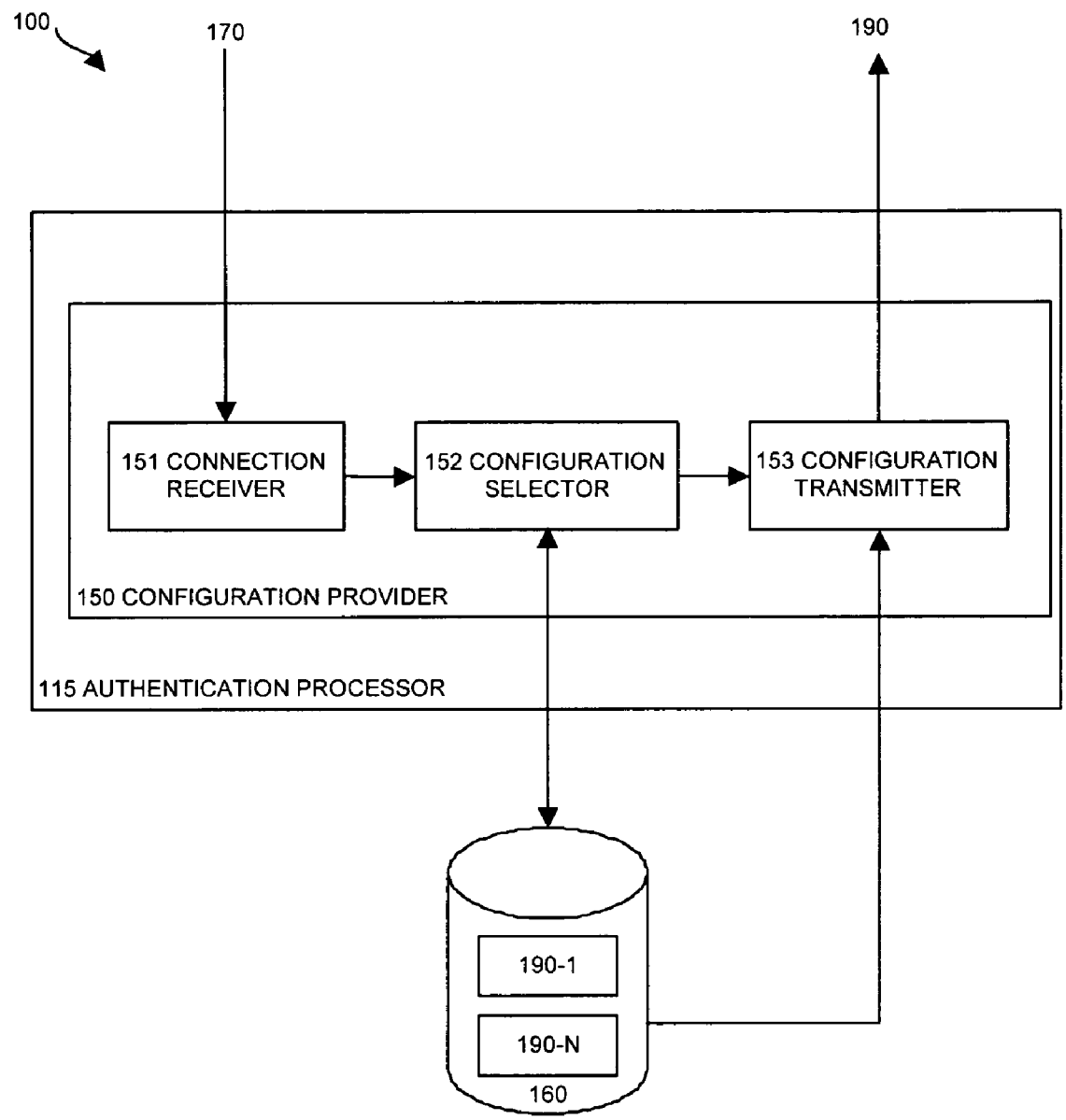
FIG. 2 shows the process of performing the authentication exchange, according to one embodiment of the invention.

FIG. 2 illustrates the process of determining the appropriate device configuration 190 within a network 100. Within the authentication server 110, there resides an authentication processor 115 which performs the authentication exchange, when a connection attempt 170 is made. The authentication processor 115 calls a sub function, configuration provider 150. The configuration provider 150 is comprised of a connection receiver 151, a configuration selector 152 and a configuration transmitter 153. The configuration selector 152 communicates with the database 160 to obtain the device configuration 190, which is transmitted to the remote device 130 by the configuration transmitter 153.

The connection receiver 151 receives the connection attempt 170, and forwards information pertaining to the remote device 130 to the configuration selector 152. Based on characteristics of the remote device 130, which will be further explained below, the configuration selector 152 determines an appropriate device configuration 190 for the remote device 130. The configuration selector 152 communicates with the database 160 to obtain the appropriate device configuration 190 for the remote device 130. The configuration selector 152 then forwards the device configuration 190 to the configuration transmitter 153, which creates the EAP request 180 containing the device configuration 190. The device configuration 190 is then transmitted to the remote device 130 within an EAP request 180, by the configuration transmitter 153.

Figure 3:
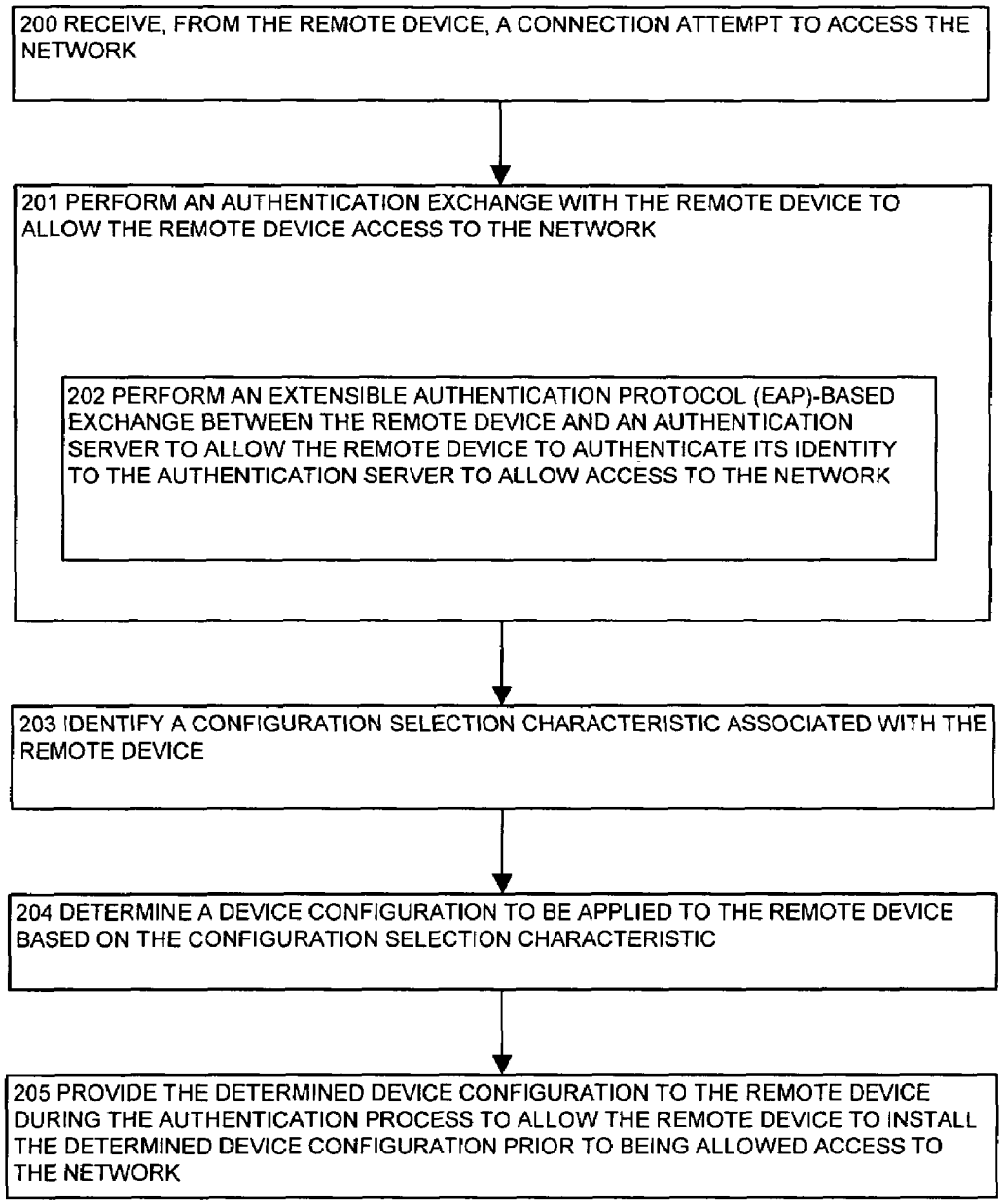
FIG. 3 illustrates a flowchart of a procedure performed by the system of FIG. 1, when the authentication server performs the authentication exchange, according to one embodiment of the invention.

FIG. 3 is a flowchart of the steps performed by the authentication server 110 to provide device configurations 190 to the remote device 130 before allowing the remote device 130 to access the network 100. The authentication server 110 performs an authentication exchange with the remote device 130 to verify that the remote device 130 has the correct network device configuration 190.

In step 200, the authentication server 110 receives a connection attempt 170 to access the network, from the remote device 130. The remote device 130 may be any type of computer system, workstation, server (e.g. web server), personal computer, laptop, mainframe, personal digital assistant devices, general purpose, or dedicated computer devices or the like, which operate any type of software, firmware of operating system. A remote device 130 may also be a data communication device (e.g. router, switches). The remote device 130 may be physically or wirelessly coupled to the network 100 to support communications.

In step 201, the authentication server 110, performs an authentication exchange with the remote device 130 to allow the remote device access to the network. The details of that authentication exchange will be explained further within the sub step of 202.

In step 202, the authentication server 110 performs an extensible authentication protocol (EAP)-based exchange between the remote device 130, and an authentication server 110 to allow the remote device 130 to authenticate its identity to the authentication server 110 to allow access to the network. This EAP-based exchange creates a secured tunnel through the gateway device 120 to allow less secure methods of authentication to execute within the secured tunnel, in a protected manner.

In step 203, during performance of the authentication exchange, the authentication server 110 identifies a configuration selection characteristic associated with the remote device 130. The details of identifying that configuration selection characteristic associated with the remote device 130 will be explained further within the sub step of 216.

In step 204, the authentication server 110 determines a device configuration 190 to be applied to the remote device 130 based on the configuration selection characteristic. The details of determining the device configuration 190 to be applied to the remote device 130 will be explained further within the sub steps of 216 though 219.

In step 205, the authentication server 110 provides the device configuration 190 to the remote device 130 by the authentication server 110 during the authentication process to allow the remote device 130 to install the device configuration 190 prior to being allowed access to the network 100. The details of providing the device configuration 190 to the remote device 130 will be further explained in sub steps 206 through 210.

Figure 4:
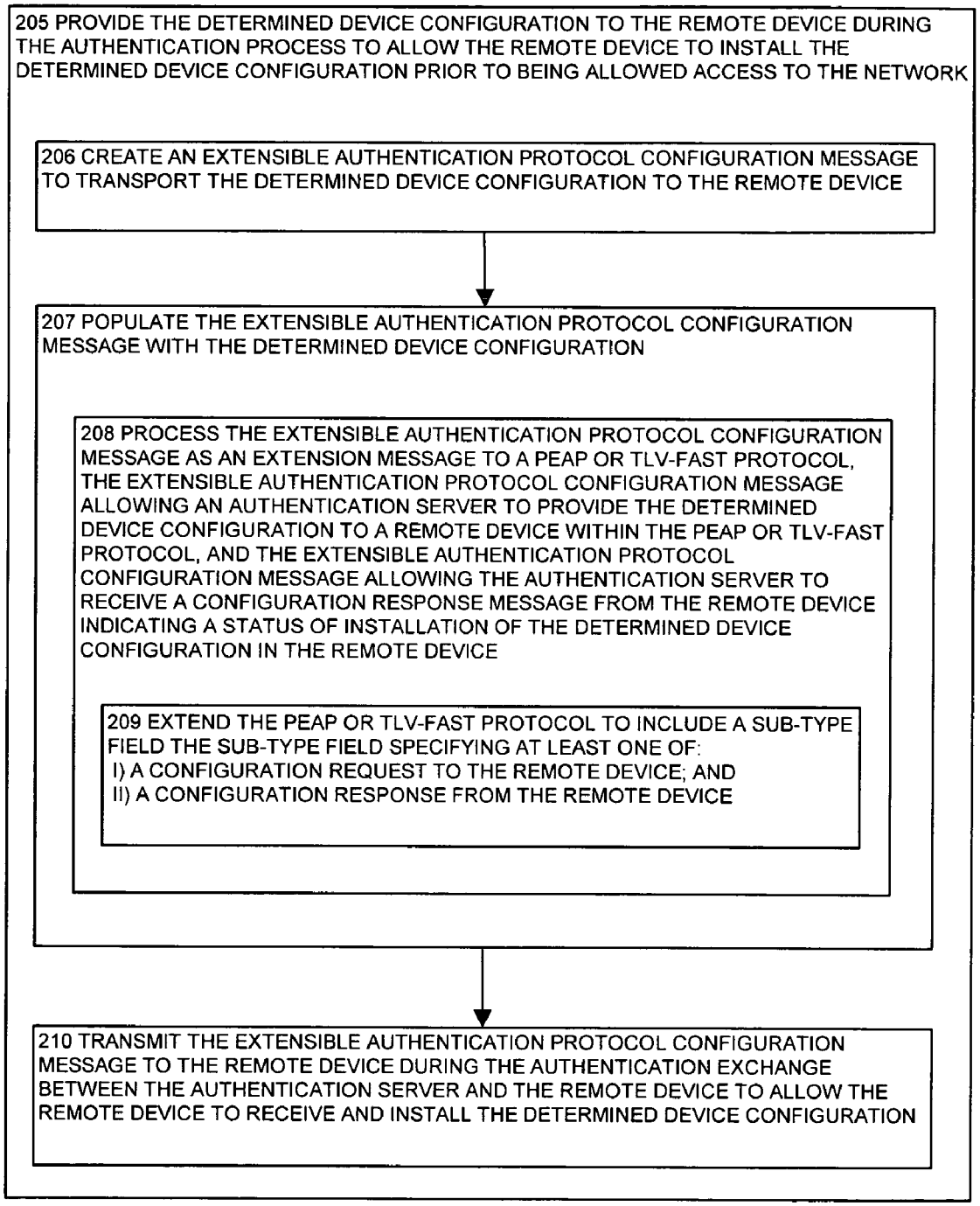
FIG. 4 illustrates a flowchart of a procedure performed by the system of FIG. 3, when the authentication server provides the determined device configuration to the remote device during the authentication process to allow the remote device to install the determined device configuration prior to being allowed access to the network, according to one embodiment of the invention.

FIG. 4 is a flowchart of the steps performed by the authentication server 110 to provide the device configuration 190 to the remote device 130 during the authentication process, to allow the remote device 130 to install the device configuration 190 prior to being allowed access to the network. The device configuration 190 is provided within an extensible authentication protocol configuration message. In return, the remote device 130 sends a response embedded in an extensible authentication protocol configuration message.

In step 206, the authentication server 110 creates an extensible authentication protocol configuration message to transport the device configuration 190 to the remote device 130.

In step 207, the authentication server 110 populates the extensible authentication protocol configuration message with the device configuration 190. The details of populating the extensible authentication protocol configuration message will be further explained in sub steps 208 and 209.

In step 208, the authentication server 110 processes the extensible authentication protocol configuration message as an extension message to a PEAP or TLV-FAST protocol. The extensible authentication protocol configuration message allows the authentication server 110 to provide the device configuration 190 to the remote device 130 within the PEAP or TLV-FAST protocol. An extensible authentication protocol configuration message is created and populated with the device configuration 190. The extensible authentication protocol configuration message is then transmitted to the remote device 130 so that the device configuration 190 can be installed on the remote device 130. The authentication server 110 can also receive a configuration response message from the remote device 130 indicating a status of installation of the device configuration 190 in the remote device 130. In response to the extensible authentication protocol configuration message transmitted to the remote device 130 by the authentication server 110, the remote device 130 transmits an extensible authentication protocol configuration message populated with a response to the extensible authentication protocol configuration message, which was sent by the authentication server 110. The details of the extensible authentication protocol configuration message will be further explained in sub step 209.

In step 209, the authentication server 110 extends the PEAP or TLV-FAST protocol to include a sub-type field. When the authentication server 110 sends a configuration request to the remote device 130 in an extensible authentication protocol configuration message processed as an extension message to a PEAP or TLV-FAST protocol, it is an EAP request 180. When the remote device 130 sends a configuration response to the authentication server 110 in an extensible authentication protocol configuration message processed as an extension message to a PEAP or TLV-FAST protocol, it is an EAP response 195. The details of the sub-type field contained within the extensible authentication protocol configuration message will be further explained in sub steps 211 through 215.

In step 210, the authentication server 110 transmits the EAP request 180 to the remote device 130 during the authentication exchange between the authentication server 110 and the remote device 130 to allow the remote device 130 to receive and install the device configuration 190.

FIG. 5 shows a flow chart of the steps performed by the authentication server 110 when the PEAP or TLV-FAST protocol is extended to include a sub-type field. The sub-type field specifies either a configuration request to the remote device 130 from the authentication server 110, or a configuration response from the remote device 130 to the authentication server 110. The details of the configuration requests and responses will be further explained within the sub steps of 211 through 215.

In step 211 the authentication server 110 extends the PEAP or TLV-FAST protocol to include a sub-type field that provides a request for an existing configuration status of the remote device 130, in the extensible authentication protocol configuration exchange message, EAP request 180, sent by the authentication server 110 to the remote device 130.

Alternatively, in step 212, the authentication server 110 extends the PEAP or TLV-FAST protocol to include a sub-type field that provides a setting of a particular configuration status on the remote device 130, in the extensible authentication protocol configuration exchange message, EAP request 180, sent by the authentication server 110 to the remote device 130.

Alternatively, in step 213, the authentication server 110 extends the PEAP or TLV-FAST protocol to include a sub-type field containing a request to perform an action on the remote device 130, in the extensible authentication protocol configuration exchange message, EAP request 180, sent by the authentication server 110 to the remote device 130.

Alternatively, in step 214, the authentication server 110 extends the PEAP or TLV-FAST protocol to include a sub-type field that receives values for a requested configuration status from the remote device 130, in the extensible authentication protocol configuration exchange message, EAP response 195, sent to the authentication server 110 from the remote device 130.

Alternatively, in step 215, the authentication server 110 extends the PEAP or TLV-FAST protocol to include a sub-type field confirming an event was executed by the remote device 130, in the extensible authentication protocol configuration exchange message, EAP response 195, sent to the authentication server 110 by the remote device 130.

FIG. 6 is a flowchart of the steps performed to determine the device configuration 190 to be applied to the remote device 130. The appropriate device configuration 190 is determined based on a configuration selection characteristic of the remote device 130. Alternatively, the authentication processor 115 can specify multiple device configurations to be sent to the remote device 130, allowing the remote device 130 to choose the most acceptable device configuration 190 to install. The details will be further explained within the sub steps of 216 through 219.

In step 216, the authentication processor 115 specifies an acceptable access level for the remote device 130. The acceptable access level indicates the security level on which the remote device 130 can access the network 100. The acceptable access level is based on the level of access requested by the remote device 130, or the location of the remote device 130 within the network 100, or the type of the remote device 130, or the role of the remote device 130 within the network 100.

Alternatively, in step 217, the authentication processor 115 selects multiple device configurations 190 for the remote device 130, any of which, when installed on the remote device, would allow the remote device 130 to securely access the network 100. The multiple device configurations 190 are provided to the authentication server 110 by the database 160.

In step 218, the authentication processor 115 transmits multiple device configurations 190 within the extensible authentication protocol configuration exchange message, EAP request 180 to the remote device 130.

In step 219, the remote device 130 chooses the most acceptable device configuration 190 from the multiple device configurations 190 transmitted to the remote device 130 from the authentication server 110, and the remote device 130 installs the most acceptable device configuration 190.

FIG. 7 is a flowchart of the steps performed by the authentication server 110 when an extensible authentication protocol configuration exchange message, EAP response 195 is received from the remote device 130, indicating the device configuration 190 has been installed on the remote device 130. The response from the remote device is embedded within the extensible authentication protocol configuration exchange message, EAP response 195, sent to the authentications server 110 from the remote device 130.

In step 220, the authentication server 110 receives a response embedded within the extensible authentication protocol configuration exchange message, EAP response 195, from the remote device 130. The details of analyzing the contents of the EAP response 195 will be further explained in sub step 221.

In step 221, the authentication server 110 verifies the remote device 130 has installed the device configuration 190. If the remote device 130 has not installed the device configuration 190, the authentication server 110 transmits the device configuration 190 to the remote device 130. Only when the device configuration 190 has been installed on the remote device 130, will the remote device 130 be allowed to access the network 100. Until the remote device 130 installs the device configuration 190, the authentication server 110 will continue to re-transmit the device configuration 190 in response to the extensible authentication protocol configuration exchange message, EAP response 195 sent by the remote device 130.

In step 222, the authentication server 110 specifies a result of the authentication exchange, based on the extensible authentication protocol configuration exchange message, EAP response 195, received by the authentication server 110 from the remote device 130. The details of specifying the result received from the remote device 130 will be further explained within the sub steps of 223 and 224.

In step 223, the authentication server 110 creates a checksum value related to the remote device 130. The checksum can be used to verify the remote device 130 has previously successfully completed the authentication exchange.

In step 224, the authentication server 110 detects another connection attempt 170 by the remote device 130. The authentication server 110 performs an abbreviated authentication exchange by comparing the checksum value to an identity associated with the remote device 130 to determine whether the remote device 130 has previously successfully completed the authentication exchange.

In step 225, the result of the authentication exchange between the authentication server 110 and the remote device 130 is stored within the database 130.

While computer systems and methods have been particularly shown and described above with references to configurations thereof, it will be understood by those skilled in the art that various changes in form and details may be made therein without departing from the scope of the invention. Accordingly, the present invention is not intended to be limited by the example configurations provided above.

What is claimed is:

1. A method, comprising:
  receiving, from a remote device, a connection attempt to access a network;
  performing an authentication exchange with the remote device comprising;
    identifying a configuration selection characteristic associated with the remote device;
    determining a device configuration to be applied to the remote device based on the configuration selection characteristic; and
    providing the determined device configuration to the remote device during the authentication process to facilitate the remote device installing the determined device configuration prior to being allowed access to the network,
  where the authentication exchange also comprises:
    performing an extensible authentication protocol (EAP)-based exchange between the remote device and an authentication server;
  where providing the determined device configuration comprises:
    creating an extensible authentication protocol configuration message (EAPCM) to transport the determined device configuration to the remote device,
      where the EAPCM is created as an extension message to a PEAP protocol or a TLV-FAST protocol, the extension message comprising a sub-type field that specifies at least one of, a configuration request to the remote device and a configuration response from the remote device,
      where the EAPCM facilitates an authentication server providing the determined device configuration to a remote device within the PEAP or TLV-FAST protocol, and
      where the EAPCM facilitates the authentication server receiving a configuration response message from the remote device indicating a status of installation of the determined device configuration in the remote device;
    populating the EAPCM with the determined device configuration; and
    transmitting the EAPCM to the remote device during the authentication exchange between the authentication server and the remote device to facilitate the remote device receiving and installing the determined device configuration.

2. The method of claim 1 where the sub-type field in a configuration request specifies at least one of:
  a request for an existing configuration status of the remote device in the extensible authentication protocol configuration;
  a setting of a particular configuration status on the remote device in the extensible authentication protocol configuration; and a trigger of an event that requests an action to be performed on the remote device in the extensible authentication protocol configuration.

3. The method of claim 1 where the sub-type field in a configuration response specifies at least one of:
values for a requested configuration status from the remote device; and
confirmation that an event was executed.

4. The method of claim 1, where determining the device configuration to be applied to the remote device comprises:
specifying an acceptable access level for the remote device, the acceptable access level indicating a security level for the remote device within the network, the acceptable access level based on the identified configuration selection characteristic that is at least one of:
a location of the remote device within the network;
a type of the remote device within the network;
a requested level of access on the network the remote device is requesting; and
a role of the remote device within the network.

5. A method of providing configuration information to a remote device before allowing the remote device to access a network, the method comprising:
receiving, from the remote device, a connection attempt to access the network;
performing an authentication exchange with the remote device to allow the remote device access to the network;
during performance of the authentication exchange:
i) identifying a configuration selection characteristic associated with the remote device;
ii) determining a device configuration to be applied to the remote device based on the configuration selection characteristic; and
iii) providing the determined device configuration to the remote device during the authentication process to allow the remote device to install the determined device configuration prior to being allowed access to the network, where determining a device configuration comprises:
selecting a plurality of device configurations, one of which, when installed on the remote device, facilitates the remote device successfully completing the authentication exchange process, and securely access the network, and
where providing the determined device configuration to the remote device comprises:
transmitting a plurality of determined device configurations to the remote device; and
allowing the remote device choose a most acceptable determined device configuration.

6. A method of providing configuration information to a remote device before allowing the remote device to access a network, the method comprising:
receiving, from the remote device, a connection attempt to access the network;
performing an authentication exchange with the remote device to allow the remote device access to the network;
during performance of the authentication exchange:
identifying a configuration selection characteristic associated with the remote device;
determining a device configuration to be applied to the remote device based on the configuration selection characteristic; and
providing the determined device configuration to the remote device during the authentication process to allow the remote device to install the determined device configuration prior to being allowed access to the network,
receiving a response from the remote device indicating an installation state of the determined device configuration;
based on the response, specifying a result of the authentication exchange; and
storing the result of the authentication exchange,
where specifying the result of the authentication exchange comprises:
creating a checksum value related to the remote device; and
where the method comprises:
detecting a successive connection attempt from the remote device, and in response, performing an abbreviated authentication exchange that performs a comparison process, upon receipt of the successive connection attempt from the remote device, using the checksum value, the comparison process comprising comparing the checksum value to an identity associated with the remote device, to determine whether the remote device has previously completed the authentication exchange process successfully.

7. A computerized device comprising:
a memory;
a processor;
a communications interface;
an interconnection mechanism coupling the memory, the processor and the communications interface;
where the memory is encoded with an authentication application that when executed on the processor produces an authentication process that causes the computerized device to provide configuration information to a remote device during authentication of the remote device and before allowing the remote device to access a network by performing the operations of:
receiving, from a remote device, a connection attempt to access the network;
performing an authentication exchange with the remote device comprising;
identifying a configuration selection characteristic associated with the remote device;
determining a device configuration to be applied to the remote device based on the configuration selection characteristic; and
providing the determined device configuration to the remote device during the authentication process to facilitate-the remote device installing the determined device configuration prior to being allowed access to the network,
where the authentication exchange also comprises:
performing an extensible authentication protocol (EAP)-based exchange between the remote device and an authentication server;
where providing the determined device configuration comprises:
creating an extensible authentication protocol configuration message (EAPCM) to transport the determined device configuration to the remote device,
where the EAPCM is created as an extension message to a PEAP protocol or a TLV-FAST protocol, the extension message comprising a sub-type field that specifies at least one of, a configuration request to the remote device and a configuration response from the remote device,
where the EAPCM facilitates an authentication server providing the determined device configuration to a remote device within the PEAP or TLV-FAST protocol, and
where the EAPCM facilitates the authentication server receiving a configuration response message from the remote device indicating a status of installation of the determined device configuration in the remote device;

populating the EAPCM with the determined device configuration; and transmitting the EAPCM to the remote device during the authentication exchange between the authentication server and the remote device to facilitate the remote device receiving and installing the determined device configuration.

8. A computerized device comprising:

a memory;

a processor;

a communications interface;

an interconnection mechanism coupling the memory, the processor and the communications interface;

where the memory is encoded with an authentication application that when executed on the processor produces an authentication process that causes the computerized device to provide configuration information to a remote device during authentication of the remote device and before allowing the remote device to access a network by performing the operations of:

receiving, from the remote device, a connection attempt to access the network;

performing an authentication exchange with the remote device to allow the remote device access to the network, the authentication exchange comprising:

identifying a configuration selection characteristic associated with the remote device;

determining a device configuration to be applied to the remote device based on the configuration selection characteristic, where determining the device configuration comprises:

transmitting a plurality of determined device configurations to the remote device; and allowing the remote device choose a most acceptable determined device configuration; and providing the determined device configuration to the remote device to facilitate the remote device installing the determined device configuration prior to being allowed access to the network.

9. A computerized device comprising:

a memory;

a processor;

a communications interface;

an interconnection mechanism coupling the memory, the processor and the communications interface;

where the memory is encoded with an authentication application that when executed on the processor produces an authentication process that causes the computerized device to provide configuration information to a remote device during authentication of the remote device and before allowing the remote device to access a network by performing the operations of:

receiving, from the remote device, a connection attempt to access the network;

performing an authentication exchange with the remote device to allow the remote device access to the network;

during performance of the authentication exchange:

identifying a configuration selection characteristic associated with the remote device;

determining a device configuration to be applied to the remote device based on the configuration selection characteristic; and providing the determined device configuration to the remote device during the authentication process to allow the remote device to install the determined device configuration prior to being allowed access to the network;

wherein when the computerized device performs the operation of providing the determined device configuration to the remote device, the computerized device performs the operation of:

receiving a response from the remote device indicating an installation state of the determined device configuration;

based on the response, specifying a result of the authentication exchange; and storing the result of the authentication exchange.

10. The computerized device of claim 9, where when the computerized device performs the operation of receiving a response from the remote device, the computerized device performs the operation of:

verifying the remote device has installed the determined device configuration, and if not, providing the determined device configuration to the remote device during the authentication process to allow the remote device to install the determined device configuration prior to being allowed access to the network.

11. The computerized device of claim 9, where when the computerized device performs the operation of specifying the result of the authentication exchange, the computerized device performs the operation of:

creating a checksum value related to the remote device; and wherein the method comprises:

detecting a successive connection attempt from the remote device, and in response, performing an abbreviated authentication exchange that performs a comparison process, upon receipt of the successive connection attempt from the remote device, using the checksum value, the comparison process comprising comparing the checksum value to an identity associated with the remote device, to determine whether the remote device has previously completed the authentication exchange process successfully.

12. A computer readable medium including computer program logic instruction encoded thereon, that when executed on a processor in a computerized device, causes the computerized device to perform the operations of:

receiving, from a remote device, a connection attempt to access the network;

performing an authentication exchange with the remote device comprising;

identifying a configuration selection characteristic associated with the remote device;

determining a device configuration to be applied to the remote device based on the configuration selection characteristic; and providing the determined device configuration to the remote device during the authentication process to facilitate-the remote device installing the determined device configuration prior to being allowed access to the network, where the authentication exchange also comprises:

performing an extensible authentication protocol (EAP)-based exchange between the remote device and an authentication server;

where providing the determined device configuration comprises:

creating an extensible authentication protocol configuration message (EAPCM) to transport the determined device configuration to the remote device, where the EAPCM is created as an extension message to a PEAP protocol or a TLV-FAST protocol, the extension message comprising a sub-type field that specifies at least one of, a configuration request to the remote device and a configuration response from the remote device, where the EAPCM facilitates an authentication server providing the determined device configuration to a remote device within the PEAP or TLV-FAST protocol, and where the EAPCM facilitates the authentication server receiving a configuration response message from the remote device indicating a status of installation of the determined device configuration in the remote device;

populating the EAPCM with the determined device configuration; and transmitting the EAPCM to the remote device during the authentication exchange between the authentication server and the remote device to facilitate the remote device receiving and installing the determined device configuration.

\* \* \* \* \*